No. 12,562. REISSUED NOV. 20, 1906.

J. A. SMITH.

AUTOMATIC ATTACHMENT FOR PIANOS.

APPLICATION FILED JAN. 28, 1904.

Witnesses:
H. Mallner
Jas. Green

Inventor
John A. Smith.
By Wm. H. Honiss. Atty.

UNITED STATES PATENT OFFICE.

JOHN A. SMITH, OF BALTIMORE, MARYLAND, ASSIGNOR TO SMITH LYRAPHONE COMPANY, A CORPORATION OF WEST VIRGINIA.

AUTOMATIC ATTACHMENT FOR PIANOS.

No. 12,562. Specification of Reissued Letters Patent. Reissued Nov. 20, 1906.

Original No. 723,056, dated March 17, 1903. Application for reissue filed January 28, 1904. Serial No. 191,066.

*To all whom it may concern:*

Be it known that I, JOHN A. SMITH, a citizen of the United States, residing at Baltimore, in the State of Maryland, have invented certain new and useful Improvements in Automatic Attachments for Pianos, of which the following is a specification.

This invention relates to automatic self-playing attachments for pianos; and the object of the invention is to provide new and novel means for supporting in place various sizes or widths of music-sheet rolls; also to provide the music-sheet-carrying frame with adjustable guides for the sheet, whereby the necessity of end flanges on the winding-roll is avoided, and thereby adapting the apparatus for the use of sheets of different widths; also to provide means for cutting off one or more of the air-ducts when it is desired to use a music-sheet containing perforations within the normal compass of the tracker, and also to provide other other parts of such apparatus of novel construction and arrangement.

The invention consists of the new and novel parts and combination of parts hereinafter shown, described, and claimed.

Figure 1:
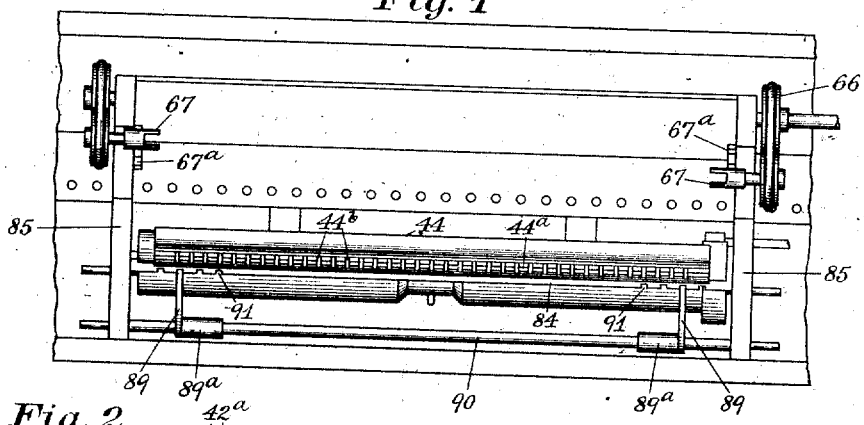
Figure 2:
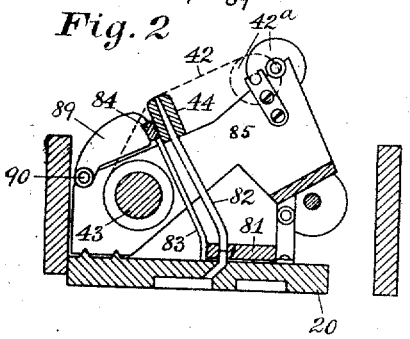
Figure 3:
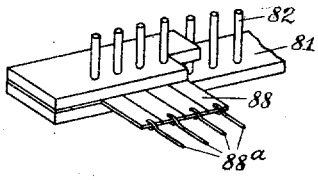
Figure 4:
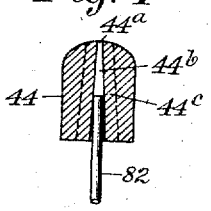
Figure 5:
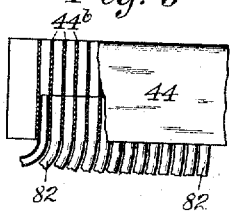
Figure 6:
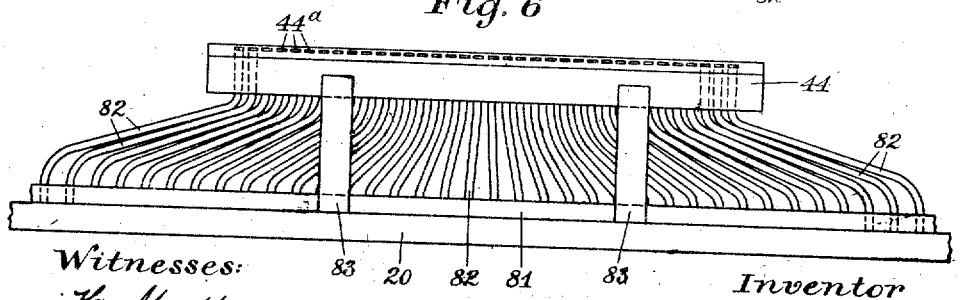

In the accompanying drawings, illustrating my invention, in the several figures of which like parts are similarly designated, Figure 1 is a plan view showing the music-sheet-receiving frame and its attachments. Fig. 2 is a detail view in section showing the music-sheet-roll-carrying frame and its attachments. Fig. 3 is a detail view showing the means for cutting off one or more of the air-ducts. Figs. 4 and 5 are details of the tracker. Fig. 6 is a front view showing separately one of the removable tracker devices comprised by the contact-bar, duct-board, and ducts.

My invention is adapted for use in connection with mechanical piano-players such as shown and described in my application for patent dated March 12, 1902, Serial No. 97,835, in which each of the series of the pneumatics—one for each key to be operated and each in line with its respective key—is reached by the outside air to inflate it through a hole in the base or top board 20 of the wind-chest, on the under side of which the pneumatics lie. On the top side of this base 20 a removable duct-board 81 is screwed, having a series of holes coincident and communicating with the holes through the base-board leading to the pneumatics.

The tracker 44 embodies a series of apertures $44^a$, in number equal to the number of pneumatics to be inflated by the passage of air through them, and arranged on a scale to correspond with the several lines of perforations in the music-sheets that are to be used. On the face of the contact-bar over which the music-sheet passes these apertures $44^a$ are quite narrow, increasing in width until the opposite side is reached, when they are about as wide as long. (See Figs. 2 and 4.) The several apertures are separated by thin wedge-shaped partitions $44^b$. Into the lower portion of each aperture a flexible tube 82 is cemented and thence carried to and cemented in its corresponding hole in the duct-board 81, thus securing free and independent passage of the outer air to each pneumatic through its respective aperture $44^a$, duct 82, and holes through duct-board 81 and base-board 20, governable by the travel of the perforated music-sheet 42 over the contact-bar 44. The contact-bar 44 is rigidly maintained in its proper position laterally and with reference to its height by the supports 83, secured to it, their lower ends being screwed to the duct-board 81, the forward side of the contact-bar resting against the board 84, which is a longitudinal part of the roll-frame. The music-sheet 42 and its spool $42^a$ and the take-up roll 43 rest in the frame 85.

To provide means for playing the several kinds of music cut to any one scale, but varying as to their compass, I make the pianista to embrace all the keys used in playing the music having the greatest compass, and in addition I include one or more notes both above and below to permit transposition without the loss of any of the higher or lower notes. For the notes above and below the range of such music as has the smaller compass I make a slide cut-off valve 88 in the duct-board 81, each being individually independent and having a stop connection $88^a$ for closing or opening the air passage or passages, as shown in detail in Fig. 3.

Upon the roll-frame 85 I provide several pairs or sets of roll carriers or brackets 67 and 67[a], as above mentioned, and the rewinding-pulleys 66 for music-spools of different lengths, some adapted to be rewound at the right-hand end and some at the left-hand end and some having a greater compass than others. Thus it will be seen that by the use of these roll-carriers arranged at varying distances from the tracker and having some rewind from the right and others rewind from the left the various styles of standard music may be played upon the instrument without changing the roller-carrying brackets or the rewinding mechanism. For instance, the fifty-eight-note music cut for the Aeolian Grand and the fifty-eight-note music for the Angelus vary in length, and one rewinds from the right and the other from the left, both of which may be played upon my improved machine. By the use of the three sets of brackets as shown and described nearly all if not all of the standard music may be played upon my machine without changing the roller-carrying brackets or the rewinding mechanism. These carriers or brackets and pulleys are all arranged at intervals back of the tracker 44, preferably those of the widest sheets first, and so on back in order of their several widths, as shown in Fig. 1. The take-up or winding roll 43 is not provided with the usual flanges at its ends for guiding the music-sheet as it is wound thereon. In accordance with my invention and instead of these flanges I provide movable or adjustable guides 89, attached to their shifting arms 89[a], adapted to be moved laterally along the bar 90, which is fixed to and forms part of the frame 85, to their proper positions to accurately guide the travel of the music-sheets as they are being moved onto the take-up roll 43. Notches 91 in the bar 84 are arranged to receive the rearward ends of the guides 89 and retain them in position to guide the sheets, which may be of any desired width.

The contact-bar 44 and the duct-board 81, with the ducts 82 cemented in them, as described, constitute a separable tracker or tracker-board, the duct-board being screwed to the top of the foundation or pneumatic board 20 and easily removable for repairs or cleaning or for the substitution of another tracker adapted for music cut in a different scale, but having a duct-board the exact counterpart of the first-described one and that will exactly fit the pianista.

In the several makes of perforated sheet-music now in general use the lines of perforations vary, some being cut five to one inch, some six to one inch, and so on, according to the particular piano player or players upon which it is designed to be used. By the use of my present invention all of the aforesaid music may be employed upon the same player.

From the foregoing description it will be seen that any number of trackers may be employed interchangeably upon the same piano-player to accommodate the particular music-sheet to be used, as the lower ends of the apertures in each of the trackers register with the air-ducts leading to the pneumatics, while the upper ends of the said apertures over which the music-sheet passes vary in scale in the several trackers, whereby music-sheets whose several lines of perforations vary may be used upon the same player simply by changing the trackers.

As shown in Figs. 4 and 5, the contact-bar 44 is constructed of a block of wood having a longitudinal slot increasing in width from the top to the bottom and provided upon each side of the slot with a series of saw-kerfs 44[c], running parallel with the sides of the slot and adapted to receive the thin wedge-shaped partitions 44[b], which are cemented in place, and thereby forming the tapering perforations 44[a], into the lower ends of which the rubber tubes 82 are crowded, and impinging the sides of said perforations and conforming to the shape thereof and being cemented in place form a perfect air-tight joint with the contact-bar. By this construction of tracker with the thin partitions it will be observed that the tubes or air-ducts where they enter the contact-bar lie in close proximity with one another, thereby forming a very compact arrangement.

Having thus described my invention, what I claim is—

1. In an automatic attachment for pianos, a tracker, and a roll-carrying frame provided with adjustable guides for the music-sheet, arranged between the tracker and the winding-roll, substantially as described.

2. In an automatic attachment for pianos, a tracker, a roll-carrying frame provided with a flangeless winding-roll, and adjustable guides for the music-sheet on said frame arranged between the tracker and the winding-roll, substantially as described.

3. In an automatic attachment for pianos, a roll-carrying frame provided with two or more independent sets of roll supporting and rewinding brackets arranged at varying distances from the tracker, and adapted to receive rolls of different lengths, substantially as described.

4. In an automatic attachment for pianos, a roll-carrying frame provided with two or more independent sets of roll supporting and rewinding brackets arranged at varying distances from the tracker, and adapted to receive rolls of different lengths, the rewinding-brackets of each set being arranged upon opposite sides of the frame, substantially as described.

5. In an automatic attachment for pianos, the combination with the wind-chest, of a separate duct-board communicating with the wind-chest, a tracker having a series of tapering perforations formed by thin flat wedge-shaped pieces inserted in saw-kerfs in a tapering slot in said tracker, and permanently connected with said duct-board by air-ducts, the said duct-board, tracker and their connecting air-ducts being adapted to be bodily removed from the wind-chest, substantially as described.

6. In an automatic attachment for pianos, the combination with the tracker having a series of tapering perforations formed by thin flat wedge-shaped pieces inserted in saw-kerfs in a tapering slot in said tracker, of air-ducts crowded in the larger ends of said perforations and cemented therein, and a duct-board to which said air-ducts are secured, substantially as described.

7. In an automatic attachment for pianos, the combination with the duct-board and air-ducts connected therewith, of a series of individually-independent cut-offs for said air-ducts, substantially as described.

8. In a pneumatic playing instrument, means for enabling the instrument to be controlled by music-sheets arranged in different scales, comprising tracker devices having a plurality of series of ducts suited to the respective scales, and means for making either of said series of ducts operable upon the instrument.

9. The combination, with the pneumatic devices of a music-playing instrument, of tracker devices comprising two differently-spaced series of ducts, and means for selectively employing either of the said series of ducts in operative relation to the said pneumatics.

10. The combination in a music-playing instrument, of a plurality of trackers having their respective ducts spaced in different scales, and means for locating and supporting either of the trackers in operative relation to the instrument.

11. The combination in a tracker-board system, of a base provided with a series of air-passages and a plurality of trackers each provided with a series of air-apertures the outlets of which in both trackers are spaced to register with the air-passages of the base, while the aperture-inlets of one tracker differ in spacing from those of the other tracker.

12. The combination in a music-playing instrument, of a base provided with a series of air-passages leading to pneumatic-actions, a plurality of perforated controlling-sheets arranged in different scales, and a plurality of trackers each provided with a series of air-apertures, the outlets of which are spaced to register with the air-passages of the base, while the aperture-inlets are spaced to register with the respective sheets.

13. The combination with a set or series of pneumatic-actions, provided with air-inlets, of a plurality of perforated controlling-sheets having their respective rows of perforations arranged in different spacing laterally of the sheet; and means for selectively establishing pneumatic connection between the said air-inlets and the differently-spaced rows of perforations of the respective controlling-sheets.

14. The combination, with a music-playing instrument, of a plurality of trackers for different scales, including a removable tracker, and means for selectively employing either of said trackers in controlling relation to the instrument.

In testimony whereof I affix my signature in the presence of two witnesses.

JOHN A. SMITH.

Witnesses:
F. P. SMITH,
ALICE E. GAFFEY.